(12) United States Patent
Kurian et al.

(10) Patent No.: US 10,749,632 B2
(45) Date of Patent: Aug. 18, 2020

(54) SMART INTEGRATED CYCLIC DATA TRANSPORT

(71) Applicant: Bank of America Corporation, Charlotte, NC (US)

(72) Inventors: Manu Kurian, Dallas, TX (US); Sorin Cismas, Southlake, TX (US); Jay Varma, Irving, TX (US); Paul Grayson Roscoe, Chester (GB); Balaji Subramanian, Coppell, TX (US); Himabindu Keesara, Farmers Branch, TX (US); Nathan Allen Eaton, Jr., Mesquite, TX (US); Vibhuti Damania, Carrollton, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/426,247

(22) Filed: May 30, 2019

(65) Prior Publication Data
US 2019/0317853 A1    Oct. 17, 2019

Related U.S. Application Data

(63) Continuation of application No. 15/790,310, filed on Oct. 23, 2017, now Pat. No. 10,355,824.

(51) Int. Cl.
*H04L 1/00* (2006.01)
*H04L 1/08* (2006.01)
(Continued)

(52) U.S. Cl.
CPC ........ *H04L 1/0061* (2013.01); *G06F 11/1004* (2013.01); *G06F 16/1734* (2019.01);
(Continued)

(58) Field of Classification Search
CPC ................................ H04L 1/0061; H04L 1/08
See application file for complete search history.

(56) References Cited

U.S. PATENT DOCUMENTS

| 5,182,752 A | * | 1/1993 | DeRoo | G06F 11/08 |
| | | | | 714/758 |
| 6,012,839 A | * | 1/2000 | Nguyen | G06F 11/1004 |
| | | | | 714/755 |

(Continued)

OTHER PUBLICATIONS

Dan Gookin, "What is FTP?" http://www.dummies.com/computers/operating-systems/windows-xp-vista/what-is-ftp/, Retrieved on Sep. 24, 2017.

(Continued)

*Primary Examiner* — Joseph D Torres
(74) *Attorney, Agent, or Firm* — Weiss & Arons LLP; Michael A. Sprigs, Esq.

(57) ABSTRACT

An apparatus for smart integrated cyclic data transport is provided. The apparatus may preserve the consistency and integrity of a file during the transfer of the file from a source system to a target system. The apparatus includes an orchestration subsystem. The orchestration subsystem includes an analyzer/generator module. The analyzer/generator module executes an algorithm on the file at the source location. An output is generated from the executed algorithm. The apparatus includes a consistency module. The consistency module pre-checks the output at the source location for pretransfer validation and creates a copy of the output. The copy may preserve the consistency and the integrity of the file. The apparatus includes a data transfer subsystem which transfers the file and the output from the source system to the target system. The apparatus may also include a validation subsystem for validating the integrity and consistency of the file.

13 Claims, 3 Drawing Sheets

(51) Int. Cl.
*G06F 16/23* (2019.01)
*G06F 16/17* (2019.01)
*G06F 11/10* (2006.01)
*H04L 9/06* (2006.01)
*H04L 29/08* (2006.01)

(52) U.S. Cl.
CPC ........ *G06F 16/2365* (2019.01); *H04L 1/0041* (2013.01); *H04L 1/0045* (2013.01); *H04L 1/08* (2013.01); *H04L 9/0643* (2013.01); *H04L 67/06* (2013.01)

(56) References Cited

U.S. PATENT DOCUMENTS

| | | | |
|---|---|---|---|
| 6,195,780 B1 * | 2/2001 | Dravida | H03M 13/091 714/758 |
| 8,537,664 B2 | 9/2013 | Goldfein et al. | |
| 8,849,955 B2 | 9/2014 | Prahlad et al. | |
| 8,898,536 B2 * | 11/2014 | Kogelnik | G06F 11/1004 714/758 |
| 8,966,112 B1 | 2/2015 | Franke et al. | |
| 9,054,913 B1 | 6/2015 | Franke et al. | |
| 2008/0240011 A1 * | 10/2008 | Kim | H04L 1/0061 370/312 |
| 2014/0297826 A1 | 10/2014 | Park | |

OTHER PUBLICATIONS

"All About SHA1, SHA2 and SHA256 Hash Algorithms," https://www.tbs-certificates.co.uk/FAQ/en/sha256.html, Jun. 30, 2017.

"FTPS," https://en.wikipedia.org/wiki/FTPS, Wikimedia Foundation, Inc., Retrieved on Sep. 24, 2017.

"INFO: Secure FTP, FTP/SSL, SFTP, FTPS, FTP, SCP . . . What's the Difference?" https://www.rebex.net/kb/secure-ftp/default.aspx, Retrieved on Sep. 24, 2017.

"Internet Protocol Suite," https://en.wikipedia.org/wiki/Internet_protocol_suite, Wikimedia Foundation, Inc., Retrieved on Sep. 24, 2017.

"Transport Layer Security," https://en.wikipedia.org/wiki/Transport_Layer_Security, Wikimedia Foundation, Inc., Oct. 19, 2017.

* cited by examiner

US 10,749,632 B2

SMART INTEGRATED CYCLIC DATA TRANSPORT

CROSS-REFERENCE TO RELATED APPLICATION

This application is a continuation of prior U.S. patent application Ser. No. 15/790,310, filed on Oct. 23, 2017, which is hereby incorporated by reference herein in its entirety.

FIELD OF TECHNOLOGY

This disclosure relates to transporting data. More specifically, this disclosure relates to preserving the consistency and integrity of one or more files during transport.

BACKGROUND

Traditional data transport protocols, such as File Transport Protocol ("FTP") or File Transport Protocol Secure ("FTPS"), use the Transmission Control Protocol/Internet Protocol ("TCP/IP") suite for transferring data, such as files. Typically, data transport protocols using the TCP/IP suite achieve a basic reliable delivery. However, the data transport protocols do not guarantee data integrity and data consistency of the transferred data. Specifically, in cases of network hiccups or system-to-system communication issues, inconsistencies and distortion of the transferred data can increase.

Therefore, there exists a need for a system that enables checking the integrity and consistency of the data during transport. Such a system is desirable in order to guarantee the consistency and integrity of the transported data.

SUMMARY OF THE DISCLOSURE

A method for smart integrated cyclic data transport is provided. The method may include executing an algorithm on a file at a source location. The file may be scheduled to be transferred from the source location to a target location. The method may include generating an output from the executed algorithm. The method may include pre-checking the output at the source location for pre-transfer validation. The method may also include creating a copy of the output. The copy of the output may form a digital wrap around the file. The digital wrap may preserve consistency and integrity of the file. The method may include transferring the file from the source location to the target location. The method may also include, upon completion of the transferring of the file, notifying a validation engine of file transfer completion.

The method may include re-executing the algorithm on the transferred file. The validation engine may perform the re-executing. The method may also include generating a second output from the re-executing. The method may also include comparing the digitally wrapped output and the generated second output in order to validate the consistency and integrity of the transferred file. The validation engine may perform the comparing.

The method may also include determining a correspondence metric. The correspondence metric may be based on the comparison between the digitally wrapped output and the generated second output.

The validation engine may verify whether the correspondence metric is greater than or less than a predetermined threshold level of correspondence. When the correspondence metric is greater than the predetermined threshold level of correspondence, the validation engine may remove the digitally wrapped output and flag the file as verified. When the correspondence metric is less than the predetermined threshold level of correspondence, the validation engine may transmit a message to a scheduling engine. The message may be regarding the lack of file integrity and consistency. The scheduling engine may reschedule the transfer of the file from the source location to the target location.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
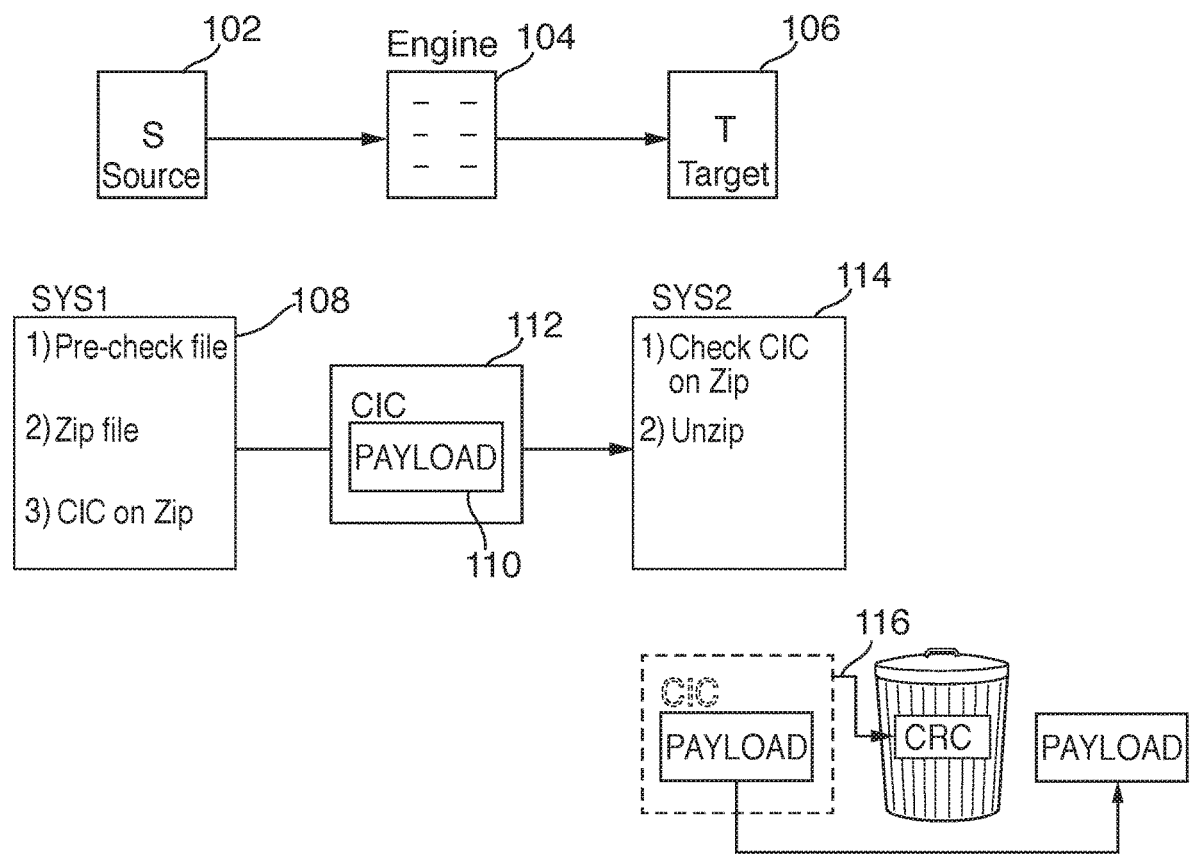
FIG. 1 shows illustrative system diagram in accordance with principles of the invention.

Apparatus and methods for smart integrated cyclic data transport is provided. The method may include executing an algorithm on one or more files at a source location. The algorithm may be a checksum algorithm. The algorithm may be a custom algorithm. The custom algorithm may be designed to overlook ANSI special characters, such as line termination characters and new line characters. Other algorithms, such as algorithms that detect data classification and/or values and automatically adjust to meet predetermined protections may be used.

The one or more files may be scheduled to be transferred from the source location to a target location. In some embodiments, a plurality of files may be combined into a group of files. In these embodiments, the group of files may be scheduled to be transferred from the source location to the target location.

The method may include generating an output from the executed algorithm. The method may include pre-checking the output at the source location for pre-transfer validation. The method may also include creating a copy of the output. The copy of the output may form a digital wrap around the file. The digital wrap may be for preserving consistency and integrity of the file. The digital wrap may be encrypted with a cryptographic hash function. The digital wrap may be encrypted with any other suitable encryption algorithm.

In some embodiments, the digital wrap may include a touch sensor. The touch sensor may be configured to transmit an alert to one or more stakeholders when a read and/or write function is attempted to be executed on the digital wrap and/or the file.

The method may include transferring the file from the source location to the target location. Upon completion of the transferring the file, the method may include notifying a validation engine of the file transfer completion. The method may include re-executing the algorithm on the transferred file. The validation engine may implement the re-executing. The method may include generating a second output from the re-executing.

The method may include comparing the digitally wrapped output and the generated second output. The comparing may validate the consistency and integrity of the transferred file.

The validation engine may implement the comparing. The method may include determining a correspondence metric. The correspondence metric may be based in part on the comparison between the digitally wrapped output and the generated second output. In some embodiments, the correspondence metric may also be based in part on a variety of other criteria.

The method may include detecting that the correspondence metric is less than a predetermined threshold level of correspondence. In response to the detecting, the method may include transmitting a message to a scheduling engine. The message may relate to the lack of file integrity and consistency. The validation engine may implement the message transmission.

The method may include scheduling retransferring the file from the source location to the target location. The scheduling may be implemented by the scheduling engine.

The method may also include injecting one or more identifiers into one or more binary locations within the file. The injecting may be executed by a tagger engine. The method may include storing data relating to the one or more identifiers and their respective one or more binary locations within the digital wrap. The method may include retransferring the file from the source location to the target location.

In some embodiments, prior to the retransferring, an auditor engine may verify that the tagger engine has injected identifiers into the binary locations recorded in the digital wrap.

At the target location, the retransferred file may be examined for identifiers and their respective binary locations. The method may include retrieving the identifiers and their respective binary locations from the retransferred file. The method may also include comparing the retrieved identifiers and their respective binary locations with the data included in the digital wrap.

The method may include determining a second correspondence metric based on the comparison between the retrieved identifiers and their respective binary locations with the data included in the digital wrap. The method may also include successfully verifying that the second correspondence metric is greater than the predetermined threshold level of correspondence. The successful verification may be done by the validation engine. The method may also include removing the digitally wrapped output. The method may also include flagging the file as verified. In some embodiments, the removal of the digitally wrapped output may occur prior to flagging the file as verified.

A system associated with the smart integrated cyclic data transport may include a non-transitory machine readable memory. The non-transitory memory may store computer executable instructions. The system may include a processor configured to execute the computer executable instructions. For example, a processor circuit may be embedded in an integrated circuit board of the system. The processor may control overall operation of the system and its associated components.

The system may include RAM, ROM, an input/output ("I/O") module and a non-transitory or non-volatile memory. The I/O module may include a microphone, button and/or touch screen which may accept user provided input. The I/O module may include one or more of a speaker for providing audio output and a display for providing textual, audiovisual and/or graphical output.

Computer executable instructions such as software applications may be stored within the non-transitory memory and/or other storage media. The software may provide instructions to the processor that enable the system to perform various functions. For example, the non-transitory memory may store software used by the system, such as an operating system, application programs, web browser and a database. Alternatively, some or all of computer executable instructions of the data transport system may be embodied in hardware or firmware components of the system.

Software application programs, which may be used by the system, may include computer executable instructions for invoking user functionality related to communication, such as email, short message service ("SMS"), and voice input and speech recognition applications. Application programs may utilize one or more algorithms that analyze computational loads processed by the system, computational loads processed devices that access the data transport system, filter confidential content or any other suitable tasks.

The system may operate in a networked environment. For example, the system may support network connections to other systems within the complex web and patch servers storing software patches. The system may support establishing network connections to one or more remote computers. Such remote computers may be nodes on a network. The nodes may be personal computers or servers that include many or all of the elements described above relative to the system.

The network connections may include a local area network ("LAN") and a wide area network ("WAN"), and may also include other networks. When used in a LAN networking environment, the system may be connected to the LAN through a network interface or adapter. The communication circuit may include the network interface or adapter.

When used in a WAN networking environment, the system may include a modem or other means for establishing communications over a WAN, such as the Internet. It will be appreciated that the existence of any of various well-known protocols such as TCP/IP, Ethernet, FTP, HTTP and the like is presumed, and the system can be operated in a client-server configuration to permit a user to retrieve web pages from a web-based server. Web browsers can be used to display and manipulate data on web pages.

The system may include various other components, such as a battery, a speaker, and antennas (not shown). For example, network nodes may be portable devices such as a laptop, a tablet, chat-bot, a smartphone or any other suitable device for receiving, storing, transmitting and/or displaying relevant information.

The system may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The system may utilize computer-executable instructions, such as program modules, executed by a computer. Generally, program modules include routines, programs, objects, components, data structures, etc. that perform particular tasks or implement particular data types. The system may be operational with distributed computing environments where tasks are performed by remote processing devices that are linked through a communications network. In a distributed computing environment, program modules may be located in both local and remote computer storage media including memory storage devices.

A device that accesses the system that may include one or more features of the system. For example, an accessing device may be a smart phone, desktop computer or other device. The accessing device may be operated by a financial center employee. For example, an applicant may use the accessing device to initiate a request to transfer data.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows the transfer of files from source system 102 to target system 106 via engine 104. System 1, shown at 108, may execute a plurality of steps prior to transferring the files. The plurality of steps may include pre-checking the files prior to file transfer. The plurality of steps may also include zipping, or compressing, the files into a single file. The plurality of steps may also include placing a consistency integrity container ("CIC") or consistency integrity skin ("CIS") around the zipped or compressed file. The CIC or CIS may include the output of an algorithm executed on the zipped or compressed file.

The file may also referred to herein as a payload. CIC 112 combined with payload 110 may be transmitted via engine 104 to system 2, shown at 114. System 2 may execute a plurality of steps upon receipt of the payload. The plurality of steps may include checking the CIC on the zipped file. Checking the CIC on the zipped file may include re-executing the algorithm on the zipped file and comparing the output of the re-execution to the output included in the CIC. When the level of similarity between the output included in the CIC and the output produced by the re-execution is greater than a predetermined threshold level of correspondence, the CIC may be discarded, as shown at 116, the payload may be unzipped and the payload may be flagged as verified.

Figure 2:
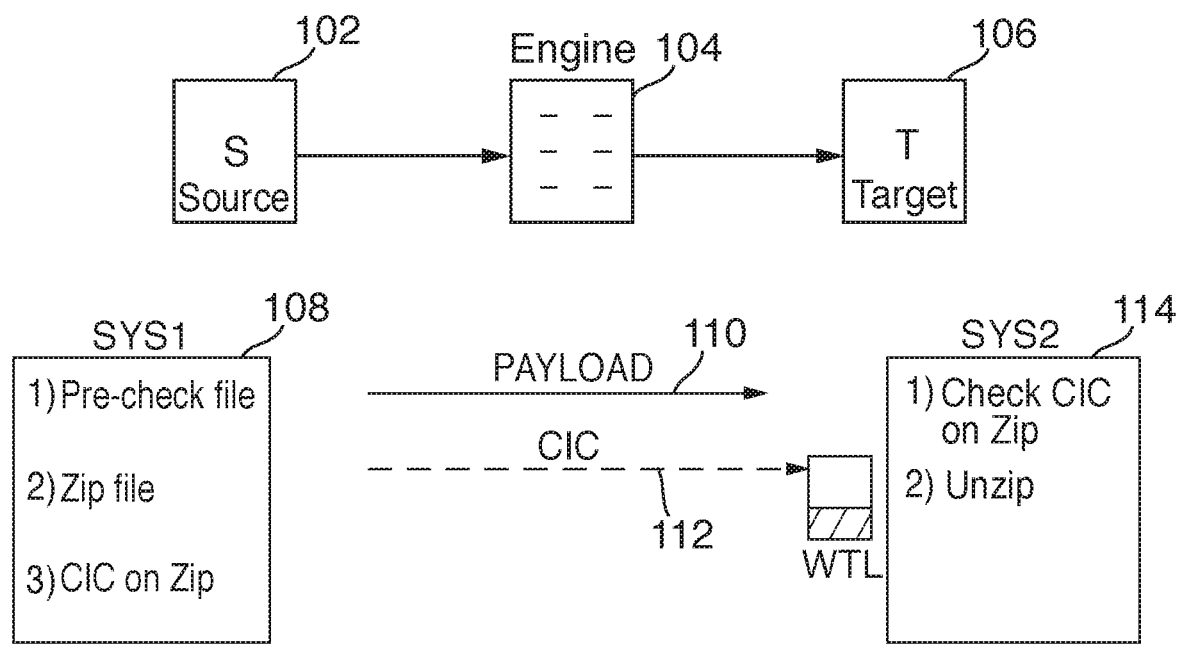
FIG. 2 shows another illustrative system diagram in accordance with principles of the invention.

FIG. 2 shows another embodiment for transferring files from source system 102 to target system 106 via engine 104. In this embodiment, the payload may be sent separately from the CIC, as shown at 110 and 112. At system 2, the output included in the CIC may be compared to the output produced by the re-execution. When the level of similarity between the output included in the CIC and the output produced by the re-execution is greater than a predetermined threshold level of correspondence, the CIC may be discarded and the payload may be flagged as verified.

In the event that the level of similarity between the output included in the CIC and the output produced by the re-execution is less than the predetermined threshold level of correspondence, a variety of actions may be executed in order to retransfer the file. The actions may include transmitting a message to a scheduling engine. The scheduling engine may schedule the retransfer of the file. The scheduling engine may request that the algorithm used to re-generate the CIC may be a more complex algorithm than the algorithm used to produce the original CIC. The scheduling engine may request that identifiers, as discussed above, be placed in the file. These additional measures may ensure that the retransferred file maintains the required consistency and integrity.

Figure 3:
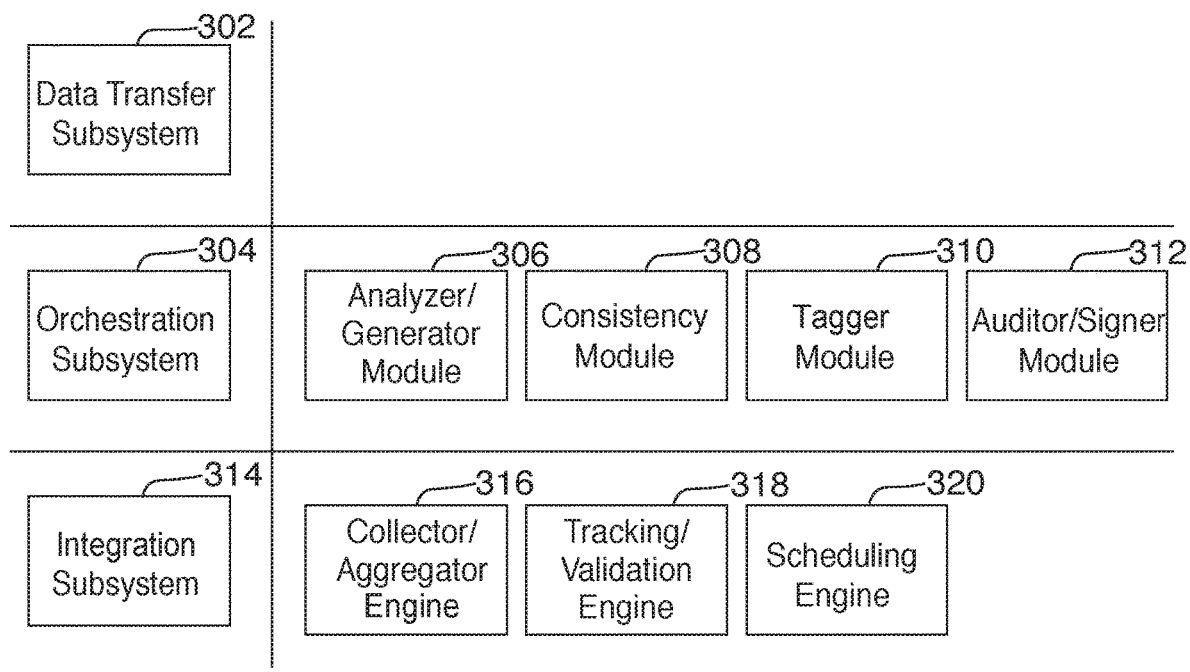
FIG. 3 shows an illustrative diagram in accordance with principles of the invention.

FIG. 3 shows an illustrative diagram of a smart integrated cyclic data transport system. The system may include multiple subsystems. Each subsystem may include one or more modules. The system may include data transfer subsystem 302, orchestration subsystem 304 and integration subsystem 314.

Data transfer subsystem 302 may include technology agnostic components for transferring data. Because components may be technology agnostic, the system may enable FTP (File transfer protocol) transport, FTPS (file transfer protocol secure) transport, SFTP transport (SSH File Transfer Protocol), HTTPS transport, FTPSSL (file transport protocol secure sockets layer) transport as well any other suitable transport protocol.

Orchestration subsystem 304 may include analyzer/generator module 306, consistency module 308, tagger module 310, auditor/signer module 312 as well as any other suitable module. Analyzer/generator module 306 may analyze the contents of a data set or file. Analyzer/generator module 306 may select an algorithm to execute on the file. The algorithm may be a checksum algorithm, a hash algorithm, such as SHA2, a custom algorithm or any other suitable algorithm. Analyzer/generator module 306 may execute the algorithm on the data set or file. The output of the algorithm may be linked to the file name. The output of the algorithm may be stored at the source system for pre-transport validation. The output may be also be linked to the data set or file for transmission to the target system for later-in-time validation.

Consistency module 308 may place the output of the algorithm in a digital wrap, CIC or CIS. The digital wrap, CIC or CIS may be wrapped around the file. The digital wrap, CIC or CIS may be a 0% deflate container. The digital wrap, CIC or CIS may include additional benefits such as compression or encryption.

In some embodiments, the digital wrap, CIC or CIS may include a touch sensor. Any read and/or write attempt to the digital wrap, CIC or CIS may generate an alert. In some embodiments, the alert may be generated when there is a read and/or write attempt to a sensitive portion of data included in the digital wrap, CIC or CIS.

A variety of encryption technologies, such as hash method authentication code ("HMAC") which employs cryptographic hash functions, such as SHA256, may be executed on the file or the digital wrap. Another encryption technology may include integrated data integrity and authenticity. A shared secret key may be provided to the exchanging systems. The shared secret key may be used as a method to establish the authenticity of the message. The shared secret key may provide multiple parties a method of verifying authenticity, verification and validation of a message. The technology used, or combination of technologies used, may vary based on performance or other factors.

Data could be stored as an identifier or even stored in a big data solution, NoSQL or the like.

Tagger Module 310 may inject and/or tag the data set or file with one or more identifiers. Tagger module 310 may also be used as a tracker to "pick up" the trails of the files. Tagger module 310 may be used in conjunction with analyzer/generator module 306 and consistency module 308 or may be used instead of analyzer/generator module 306 and consistency module 308. In some embodiments, it may not be desirable to use tagger module 310. This may occur in a scenario where injecting tags into a file may risk impacting the integrity of the file.

Auditor/signer module 312 may verify the integrity of tagger module 310. Auditor/signer module 312 may check that tagger module 310 placed the identifiers in the specified binary locations. Auditor/signer module 312 may also sign the keys when data integrity and authenticity technology is used.

Integration subsystem 314 may include collector/aggregator engine 316, tracking/validation engine 318 and scheduling engine 320. Collector/aggregator engine 316 may combine a set of files so that their size is not too large and not too small for the algorithm to be effectively executed on the files.

In some embodiments, collector/aggregator engine 316 executes an algorithm on each file included in a group of files. This execution of an algorithm may increase effectiveness with respect to insuring integrity of the transfer of files. The algorithm may potentially leverage machine learning and can determine transfer size, time and the like. For example, transfer of sets of large files could entail partitioning the large file(s) into multiple files to achieve a degree of parallelism in the overall process, not just the network transfer. Zipping a group of relatively small files could simplify the movement/integrity checking but the algorithm may need to take potential limitations in its scalability depending on size and other factors.

In some embodiments, tracking/validation engine 318 may be notified about the transfer completion. Tracking/validation engine 318 may then compare the CIS with the output of the re-executed algorithm. If the file fails the data integrity check, the engine can notify scheduling engine 320 of the problem, where scheduling engine 320 can then schedule the retransfer of the file. Once the file is received and the integrity is successfully verified by the tracking/validation engine 318, an auditor/signer sub-component can be notified. There may also be a detection agent that is able to preview the destination to detect potentially pre- and post-transfer/check conflicts.

In certain embodiments, scheduling engine 320 may be responsible for scheduling the file transfers. Scheduling engine 320 may receive input from the integration engine regarding what files should be transferred. Scheduling engine 320 can schedule the transfers based on parameters such as time, priority, available bandwidth, etc.

Various exemplary solutions for transferring a file or number of files at folder A (at a source) to folder B (at a destination) are provided below. Typically, the examples use the native zipping tool as a method and generalized term to indicate one process of the CIS/CIC process.

Example 1

Send the zip file and checksum file
Zip the files at folder A.
Create a checksum and save it in an encrypted/protected token.
Transfer the zip file and the checksum file to the folder B at destination.
Determine if the zip file has the same content before it was sent using the checksum from the checksum file.
If contents are same, unzip the zip file.
If contents differ, alert the user.

Example 2

Send the files and checksum file in Zip file.
Create a checksum and save it in an encrypted/protected token.
Zip the files at folder A which includes the checksum in the encrypted/protected token.
Transfer the zip file to the folder B at destination.
Unzip the zip file at folder B at destination.
Using the checksum from the checksum file, check if file or files has the same content before it was sent using the checksum from the checksum file.
If contents are the same, the file transfer is a success.
If contents differ, alert the user.

Example 3

Send the zip file, checksum file and password file and encrypt zip file. A password may be used to decrypt the zip file.
Zip the files at folder A, encrypt it with a password.
Save the password in an encrypted/protected token.
Create the checksum and save it in some encrypted/protected token.
Transfer the zip file, encrypted/protected token (checksum, password) to the folder B at destination.
Decrypt the zip file using password from the encrypted/protected token.
Check if the zip file has the same content before it was sent using the checksum from the encrypted/protected token.
If contents are the same, unzip the zip file.
If contents differ, alert the user.

Example 4

Send the checksum and files in zip file in an encrypted/protected token, encrypt the zip file and a password may be used to decrypt the zip file.
Create the checksum and save it in an encrypted/protected token.
Zip the files at folder A, which includes the checksum file, and encrypt with a password to an encrypted/protected token.
Save the password in an encrypted/protected token.
Transfer the zip file and the password file to the folder B at the destination.
Decrypt the zip file using the password from some encrypted/protected token.
Unzip the zip file at folder B at the destination.
Using the checksum from the checksum file, check if file or files has the same content before it was sent. The checking may be performed using the checksum from the encrypted/protected token.
If contents are the same, the file transfer is a success.
If contents differ, alert the user.

Thus, systems and methods for smart integrated cyclic data transport have been provided. Persons skilled in the art will appreciate that the present invention can be practiced by other than the described embodiments, which are presented for purposes of illustration rather than of limitation. The present invention is limited only by the claims that follow.

What is claimed is:

1. A method for smart integrated cyclic data transport, the method comprising:
   executing an algorithm on a file at a source location, said file being scheduled to be transferred from the source location to a target location;
   generating an output from the executed algorithm;
   pre-checking the output at the source location for pre-transfer validation;
   creating a copy of the output, the copy of the output forming a digital wrap around the file, said digital wrap for preserving consistency and integrity of the file;
   transferring the file from the source location to the target location;
   upon completion of the transferring the file, notifying a validation engine of the file transfer completion;
   re-executing the algorithm, by the validation engine, on the transferred file;
   generating a second output from the re-executing;
   comparing, by the validation engine, the digitally wrapped output and the generated second output in order to validate the consistency and integrity of the transferred file;
   determining a correspondence metric, between the digitally wrapped output and the generated second output, based on the comparison;
   when the validation engine successfully verifies that the correspondence metric is greater than a predetermined threshold level of correspondence, the validation engine removes the digitally wrapped output and flags the file as verified;
   when the validation engine detects that the correspondence metric is less than the predetermined threshold level of correspondence, the validation engine transmits a message to a scheduling engine regarding the lack of file integrity and consistency and the scheduling engine reschedules the transfer of the file from the source location to the target location.

2. The method of claim 1, wherein the algorithm is a checksum algorithm performed on the contents of the file.

3. The method of claim 1, wherein:
   prior to the file transfer, a tagger engine injects one or more identifiers into one or more binary locations within the file;
   data relating to the one or more identifiers and the one or more respective binary locations are stored in the digital wrap;
   upon completion of the file transfer, the validation engine:
      examines the transferred file for identifiers and their respective binary locations;
      retrieves, from the transferred file, the examined identifiers and their respective binary locations;
      compares the retrieved identifiers and their respective binary locations with the data included in the digital wrap;
      uses the comparison of the retrieved identifiers and their respective binary locations with the data included in the digital wrap to determine, at least in part, the correspondence metric.

4. The method of claim 3, wherein, prior to the file transfer and upon completion of the tagger engine injecting the identifiers into the one or more respective binary locations within the file, an auditor engine verifies that the tagger engine has injected the identifiers into the binary locations recorded in the digital wrap.

5. The method of claim 3, wherein, when the validation engine successfully verifies that the correspondence metric is greater than the predetermined threshold level of correspondence, the validation engine removes the identifiers from within the file prior to flagging the file as verified.

6. The method of claim 1, wherein the digital wrap is encrypted with a cryptographic hash function.

7. The method of claim 1, wherein the digital wrap includes a touch sensor, said touch sensor being configured to transmit an alert to one or more stakeholders when a read and/or write function is attempted to be executed on the digital wrap and/or the file, said read and/or write attempt occurring prior to receipt of the file at the target location.

8. A method for smart integrated cyclic data transport, the method comprising:
   executing an algorithm on a file at a source location, said file being scheduled to be transferred from the source location to a target location;
   generating an output from the executed algorithm;
   pre-checking the output at the source location for pre-transfer validation;
   creating a copy of the output, the copy of the output forming a digital wrap around the file, said digital wrap for preserving consistency and integrity of the file;
   transferring the file from the source location to the target location;
   upon completion of the transferring the file, notifying a validation engine of the file transfer completion;
   re-executing the algorithm, by the validation engine, on the transferred file;
   generating a second output from the re-executing;
   comparing, by the validation engine, the digitally wrapped output and the generated second output in order to validate the consistency and integrity of the transferred file;
   determining a correspondence metric based on the comparison between the digitally wrapped output and the generated second output;
   detecting, by the validation engine that the correspondence metric is less than a predetermined threshold level of correspondence;
   in response to the detecting, transmitting, by the validation engine, a message to a scheduling engine regarding the lack of file integrity and consistency;
   scheduling, by the scheduling engine, retransferring of the file from the source location to the target location;
   injecting, by a tagger engine, one or more identifiers into one or more binary locations within the file;
   storing data relating to the one or more identifiers and their respective one or more binary locations within the digital wrap;
   retransferring the file from the source location to the target location;
   examining, at the target location, the retransferred file for identifiers and their respective binary locations;
   retrieving, from the retransferred file, the identifiers and their respective binary locations;
   comparing the retrieved identifiers and their respective binary locations with the data included in the digital wrap;
   determining a second correspondence metric based on the comparison between the retrieved identifiers and their respective binary locations with the data included in the digital wrap;

successfully verifying, by the validation engine, that the second correspondence metric is greater that the predetermined threshold level of correspondence;

removing the digitally wrapped output; and flagging the file as verified.

9. The method of claim 8, wherein the algorithm is a checksum algorithm.

10. The method of claim 8, wherein, prior to the retransferring the file from the source location to the target location and upon completion of the tagger engine injecting the identifiers into the one or more respective binary locations within the file, an auditor engine verifies that the tagger engine has injected the identifiers into the binary locations recorded in the digital wrap.

11. The method of claim 8, wherein, when the validation engine successfully verifies that the second correspondence metric is greater than the predetermined threshold level of correspondence, the validation engine removes the identifiers from within the file prior to flagging the file as verified.

12. The method of claim 8, wherein the digital wrap is encrypted with a cryptographic hash function.

13. The method of claim 8, wherein the digital wrap includes a touch sensor, said touch sensor being configured to transmit an alert to one or more stakeholders when a read and/or write function is attempted to be executed on the digital wrap and/or the file, said read and/or write attempt occurring prior to completion of the retransferring.

* * * * *